United States Patent
Collmeyer et al.

(10) Patent No.: US 6,324,079 B1
(45) Date of Patent: Nov. 27, 2001

(54) FOUR AND FIVE TERMINIAL PWM-CONTROLLED POWER SUPPLY PACKAGES

(75) Inventors: Arthur J. Collmeyer, Incline Village, NV (US); Mark D. Telefus, Orinda, CA (US)

(73) Assignee: Iwatt, Campbell, CA (US)

( * ) Notice: Subject to any disclaimer, the term of this patent is extended or adjusted under 35 U.S.C. 154(b) by 0 days.

(21) Appl. No.: 09/679,943

(22) Filed: Oct. 4, 2000

Related U.S. Application Data

(60) Provisional application No. 60/213,808, filed on Jun. 22, 2000, and provisional application No. 60/209,707, filed on Jun. 5, 2000.

(51) Int. Cl.⁷ .................................................. H02M 3/335
(52) U.S. Cl. .......................................................... 363/21.15
(58) Field of Search .................................. 363/20, 21.01, 363/21.12, 21.15, 21.16, 49, 95, 97, 131

(56) References Cited

U.S. PATENT DOCUMENTS

| | | | |
|---|---|---|---|
| 5,014,178 | * 5/1991 | Balakrishnan | 363/49 |
| 5,313,381 | 5/1994 | Balakrishnan | 363/147 |
| 5,973,945 | * 10/1999 | Balakrishnan et al. | 363/80 |
| 6,147,883 | * 11/2000 | Balakrishnan et al. | 363/49 |
| 6,169,444 | * 1/2001 | Thuber, Jr. | 327/536 |

* cited by examiner

Primary Examiner—Matthew Nguyen
(74) Attorney, Agent, or Firm—Lyon & Lyon LLP

(57) ABSTRACT

A power supply package for pulse-width modulated control of a power converter includes a first terminal for coupling to a primary winding of a transformer; a second terminal for coupling to an activation gate of an external power switch; a third terminal for coupling to a ground reference; and a fourth terminal for coupling to a combined source of operating power and feedback signal, the feedback signal based on an output load voltage across a secondary winding of the transformer. The package includes an internal power switch having an input coupled to the first terminal, an output coupled to the third terminal, and an activation gate. The package further includes control circuitry responsive to the feedback signal, the control circuitry having a first output coupled to the internal switch activation gate and a second output coupled to the second terminal, the control circuitry configured to drive the internal and external power switches.

32 Claims, 16 Drawing Sheets

FOUR AND FIVE TERMINIAL PWM-CONTROLLED POWER SUPPLY PACKAGES

RELATED APPLICATION DATA

This application is a related to U.S. Provisional Application Serial No. 60/213,808, filed Jun. 22, 2000, and U.S. Provisional Application Serial No. 60/209,707, filed Jun. 5, 2000, both of which are fully incorporated by reference.

FIELD OF THE INVENTION

This invention pertains generally to the field of power conversion and, more particularly, to switching power supplies with feedback control.

BACKGROUND

Compact and efficient power supplies are an increasing concern to users and manufacturers of electronics. Switching power supplies with pulse width modulated ("PWM") controllers offer both compactness and efficiency in a number of different topologies. Boost and buck switching power supply topologies are efficient, but do not isolate the power input from the power output. Other topologies, such as the flyback, do isolate the power input from the power output by using a transformer. In such topologies, feedback from the secondary (power output) side of the transformer is needed to adjust the pulse width modulation duty cycle of the power switch. PWM control for a switching power supply may be provided from a single integrated circuit chip or package having some number of external connection pins or terminals. As with many other types of integrated circuit chips or packages, limiting the number of external connection terminals of a power supply package can be advantageous.

For example, U.S. Pat. No. 5,313,381 to Balakrishnan (the "'381 patent"), which is fully incorporated by reference, discloses a three-terminal switching power supply control chip for use with a flyback converter. FIG. 1 illustrates a flyback converter 20 according to the '381 patent. The converter 20 employs a three-pin control chip 22 to supply current from a rectified DC source ($V_{bb}$) 28 across an isolating transformer 24 to supply power for a load 26. The power supply chip 22 includes a first terminal 30 coupled to a primary winding 32 of the transformer 24, a second ("ground") terminal 36 coupled to a primary side ground reference, and a third terminal 40 for accepting a combined feedback control signal ($I_{FB}$) and a bias supply voltage ($V_{cc}$) to operate the control chip 22.

Within the power supply chip 22, the first terminal 30 is alternately coupled to the ground terminal 36 by a power transistor switch 42. PWM control circuitry 44 drives the power switch 42 at a variable duty cycle. When the power switch 42 is ON, current flows through the primary winding 32 and energy is stored in the magnetic core 45 of the transformer 24. When the switch 42 is OFF, a secondary diode 46 is forward biased and the stored energy in the transformer core 45 is released through a secondary winding 48 to a filter/storage capacitor 47 and the load 26. After the transformer 24 is reset, the ON/OFF cycle is repeated.

An error amplifier 50 compares the output voltage $V_{out}$ across the load 26 with a reference voltage to generate the feedback control signal $I_{FB}$. The bias supply voltage $V_{cc}$ is supplied from an auxiliary secondary winding 52 of the transformer 24. The bias supply voltage $V_{cc}$ is modulated with the feedback control signal $I_{FB}$ in an opto-isolator 54 to create the combined bias voltage, feedback signal $V_{cc}/I_{FB}$. A feedback extraction circuit (not shown) in the chip 22 separates the feedback signal $I_{FB}$ from the bias voltage $V_{cc}$ by sensing the excess current flowing through a shunt regulator. The extracted feedback signal $I_{FB}$ is used to control the output of the PWM circuitry 44 to constantly adjust the duty cycle of the power switch 42 so as to transfer greater or lesser current to the secondary.

While the flyback converter taught by the '381 patent provides certain advantages, it would be desirable to provide minimal terminal power supply packages for other types of converter topologies, including multi-switch controlled power converter topologies.

SUMMARY OF THE INVENTION

In accordance with a first aspect of the invention, a power converter comprising a transformer having forward-biased and flyback-biased secondary windings is operated by a three terminal, PWM-controlled power supply package.

In a preferred embodiment, the power supply package has a first terminal coupled to a main primary winding of a transformer, a second terminal coupled to a ground reference and a third terminal connected to a combined source of operating power and feedback signal. The power supply package includes a power switch having an input coupled to the first terminal, an output coupled to the second terminal, and an activation gate. The package further includes PWM control circuitry responsive to the feedback signal and coupled to the power switch activation gate. A second primary winding is provided for resetting the transformer core.

In accordance with a further aspect of the invention, a four terminal, PWM-controlled power supply package for operating a power converter is provided.

In a preferred embodiment, the power supply package includes a first terminal for coupling to a primary winding of a transformer, a second terminal for coupling to an activation gate of an external power switch, a third terminal for coupling to a ground reference, and a fourth terminal for coupling to a combined source of operating power and feedback signal. The package includes an internal power switch having an input coupled to the first terminal, an output coupled to the third terminal, and an activation gate. The package further includes PWM control circuitry responsive to the feedback signal, the control circuitry including gate drive circuitry having a first output coupled to the internal switch activation gate and a second output coupled to the second terminal.

In an alternate preferred embodiment, the four terminal power supply package further includes a second internal power switch having an input coupled to the second terminal, an output coupled to the third terminal, and a second switch activation gate. In this embodiment, the gate drive circuitry has a first output coupled to the first internal switch activation gate and a second output coupled to the second internal switch activation gate.

In accordance with a still further aspect of the invention, a five terminal, PWM-controlled power supply package for operating a power converter is provided.

In a preferred embodiment, the power supply package includes a first terminal for coupling to a primary winding of a transformer, a second terminal for coupling to an activation gate of an external power switch, a third terminal for coupling to a ground reference, a fourth terminal for coupling to a source of operating power, and a fifth terminal for coupling to a feedback signal. The package includes an internal power switch having an input coupled to the first terminal, an output coupled to the third terminal, and an activation gate. The package further includes PWM control circuitry responsive to the feedback signal, the control circuitry including gate drive circuitry having a first output coupled to the internal power switch activation gate and a second output coupled to the second terminal.

In an alternate preferred embodiment, the five terminal power supply package further includes a second internal power switch having an input coupled to the second terminal, an output coupled to the third terminal, and a second switch activation gate. In this embodiment, the gate drive circuitry has a first output coupled to the first switch activation gate and a second output coupled to the second switch activation gate.

Other objects and features of the present inventions will become apparent hereinafter.

BRIEF DESCRIPTION OF THE DRAWINGS

The drawings illustrate both the design and utility of the preferred embodiments of the resent invention, in which similar elements in different embodiments are referred to by the same eference numbers for purposes of ease in illustration of the invention, wherein.

DETAILED DESCRIPTION OF THE PREFERRED EMBODIMENTS

Figure 2:
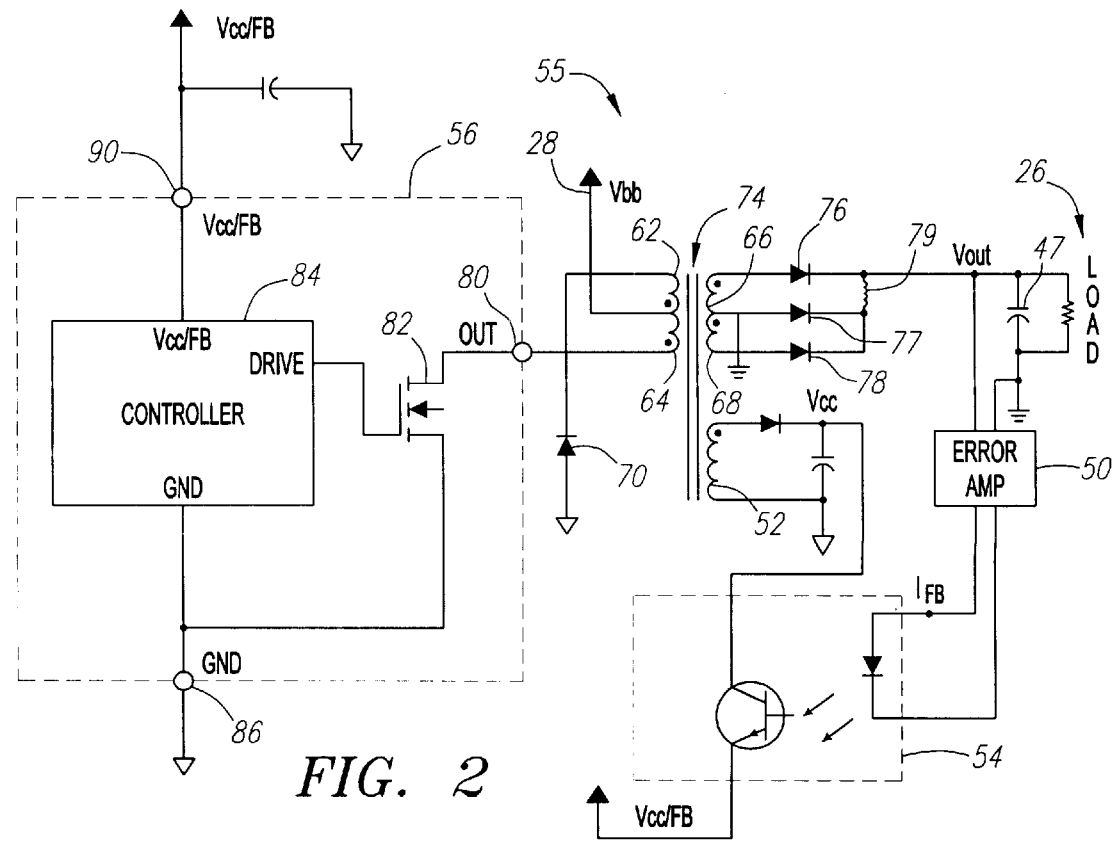
FIG. 2 is a schematic diagram of a fly-forward converter employing a three-terminal switching power supply package in accordance with one aspect of the invention.

Referring to FIG. 2, in accordance with a one aspect of the invention, a fly-forward converter 55 employs a three-terminal power supply package 56 to supply current from a rectified DC source (V$_{bb}$) 28 across an isolating transformer 74 to supply power for a load 26. The power supply package 56 includes a first terminal 80 coupled to a first end of a first primary winding 64 of transformer 74, a second terminal 86 coupled to a primary side ground reference, and a third terminal 90 for accepting a combined feedback control signal (I$_{FB}$) and a bias supply voltage (V$_{cc}$) to operate the power supply package 56. Source V$_{bb}$ 28 is coupled a second end of the first primary winding 64, and is also coupled to a first end of a second primary winding 62 of transformer 74. A second end of the second primary winding 62 is coupled to the primary side ground reference via a voltage clamp diode 70.

The first terminal 80 of power supply package 56 is alternately coupled to the ground terminal 86 by a power switch 82. PWM control circuitry 84 drives the power switch 82 at a variable duty cycle. When the power switch 82 is ON, current flows through the first primary winding 64 and current is transferred through a first secondary winding 66 and forward biased diode 76 to a filter/storage capacitor 47 and the load 26.

When the switch 82 is OFF, energy stored in the core of the transformer 74 is transferred as current through a second secondary winding 68 and diode 78, via filter inductor 79, to the filter/storage capacitor 47 and load 26. In order to reset the magnetic core of transformer 74, a second ("reset") primary winding 62 is provided to further transfer current flowing "from ground" through clamping diode 70 to the second primary winding 62 and transferred to the secondary winding 68. A further diode 77 is provided to transfer any remaining current from secondary winding 68 to the load 26, "pulled" by the current flow through filter inductor 79, once the voltage across diode 78 drops to its reverse bias point. Notably, the voltage at the drain terminal of switch 82 is effectively clamped by diode 70 to prevent any breakdown of the transistor. After the transformer 74 is reset, the ON/OFF cycle is repeated.

As with the power supply of the '381 patent, an error amplifier 50 compares the output voltage Vout across the load 26 with a reference voltage to generate the feedback control signal IFB. The bias supply voltage Vcc is supplied from an auxiliary secondary winding 52 of the transformer 74. The bias supply voltage Vcc is modulated with the feedback control signal IFB in an opto-isolator 54 to create the combined bias voltage, feedback signal Vcc/IFB. A feedback extraction circuit (not shown) in the power supply 56 separates the feedback signal IFB from the bias voltage Vcc by sensing the excess current flowing through a shunt regulator. The extracted feedback signal IFB is used to control the output of the PWM circuitry 84 to constantly adjust the duty cycle of the power switch 82 so as to transfer greater or lesser current to the secondary.

Figure 2A:
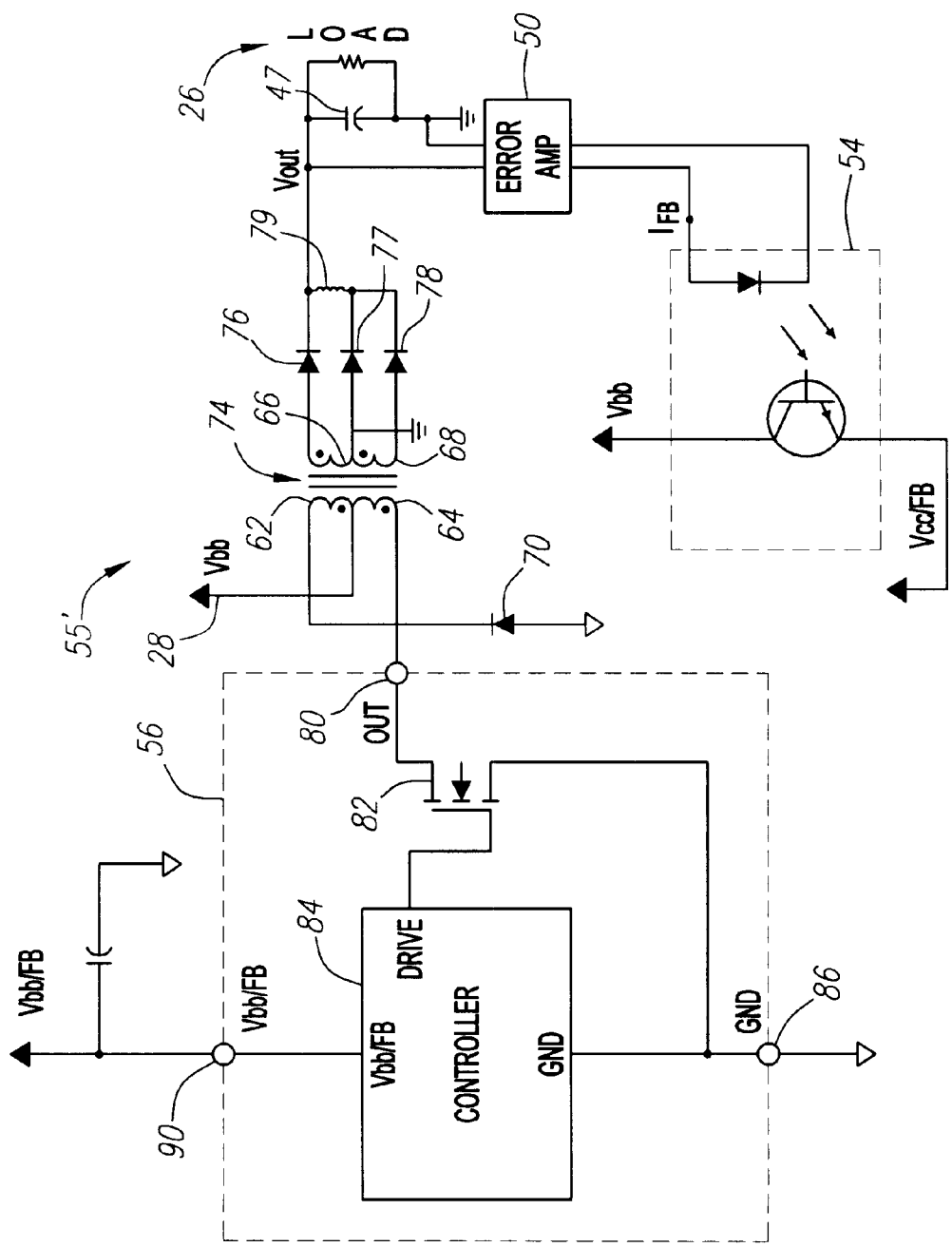
FIG. 2A is a schematic diagram of the push-pull converter of FIG. 2, wherein operating power for the power supply package is supplied by the input supply to the converter.

FIG. 2A shows an alternate embodiment of the converter topology of FIG. 2, (designated as "55'"), wherein operating power for the power supply package 56 is supplied from the rectified DC input source Vbb.

Figure 3:
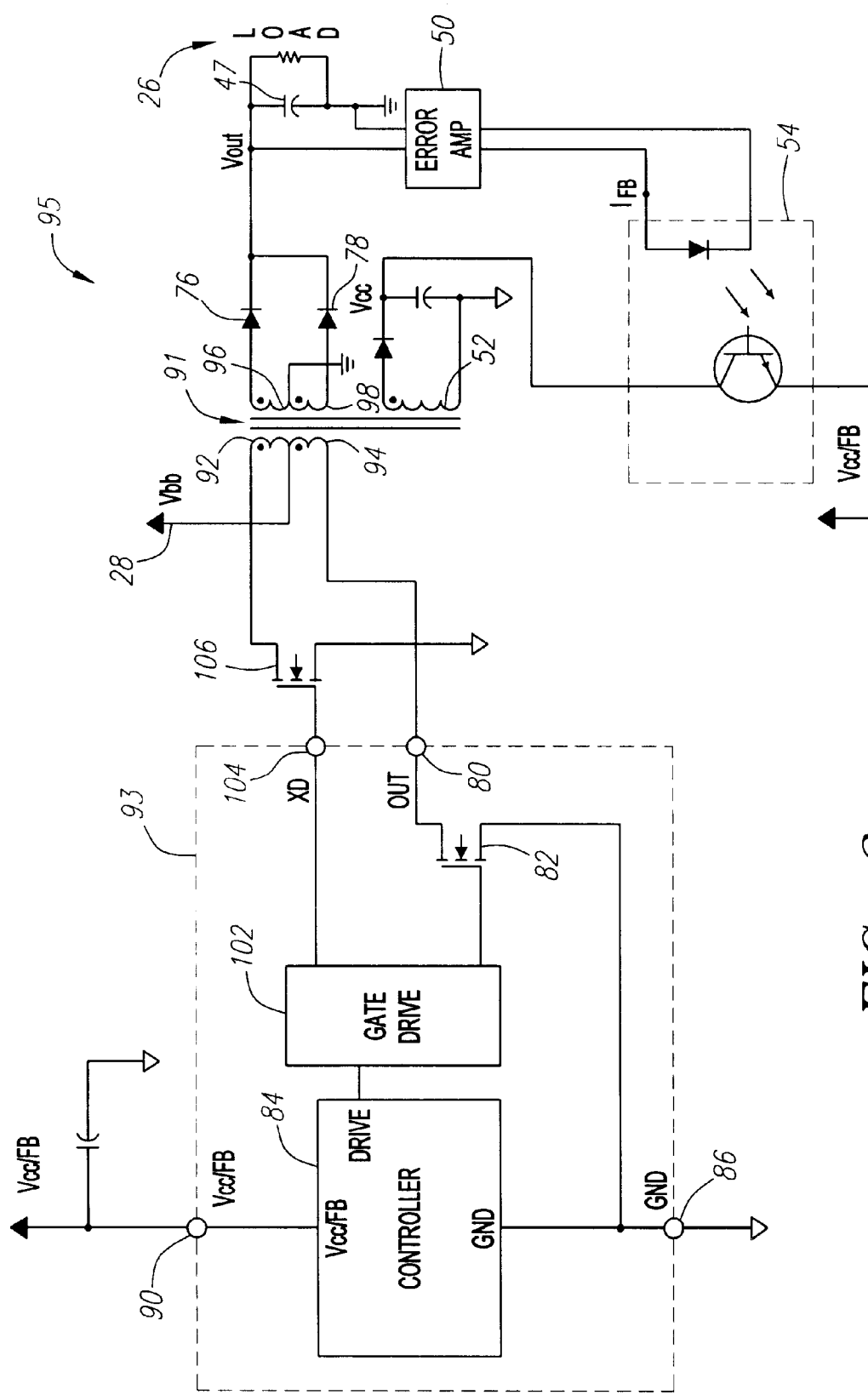
FIG. 3 is a schematic diagram of a first preferred push-pull converter employing a four-terminal switching power supply package constructed in accordance with another aspect of the invention, wherein operating power for the power supply package is supplied by an auxiliary output of the converter.

Referring to FIG. 3, in accordance with a further aspect of the invention, a push-pull converter 95 employs a four-terminal power supply package 93 to supply current from the DC source Vbb across transformer 91 to supply power to load 26. The power supply package 93 includes a first terminal 80 coupled to a first end of a first primary winding 94 of transformer 91, a second terminal 86 coupled to a primary side ground reference, a third terminal 90 for accepting a combined feedback control signal (IFB) and bias supply voltage (Vcc), and a fourth terminal 104 coupled the activation gate of an external power switch 106.

Note: As used herein when describing elements of the preferred embodiments, "external power switch" refers to a switch located outside of a power supply package, and "internal power switch" refers to a switch located within a power supply package.

The source Vbb is coupled a second end of the first primary winding 94, and is also coupled to a first end of a second primary winding 92 of transformer 91. A second end of the second primary winding 92 is coupled to the drain terminal of the external power switch 106, with the source terminal of switch 106 coupled to the primary side ground reference. The first terminal 80 of the power supply package 93 is alternately coupled to the ground terminal 86 by an internal power switch 82.

By way of a gate drive circuit 102, PWM control circuitry 84 in the power supply package 93 alternately drives the internal power switch 82 and external power switch 106, —i.e., such that when external switch 106 is ON, internal switch 82 is OFF and vice versa. When the external power switch 106 is ON, current flows through primary winding 92 and is transferred through a secondary winding 98 and forward biased diode 78 to the filter/storage capacitor 47 and load 26. When the internal switch 82 is ON, current flows through primary winding 94 and is transferred through a secondary winding 96 and forward biased diode 76 to the filter/storage capacitor 47 and load 26. As will be appreciated by those skilled in the art, the transformer 91 is self-resetting (i.e., due to the 180° current flows from the pull-push operation of switches 82 and 106). After the transformer 91 is reset, the ON/OFF cycle is repeated.

Figure 1:
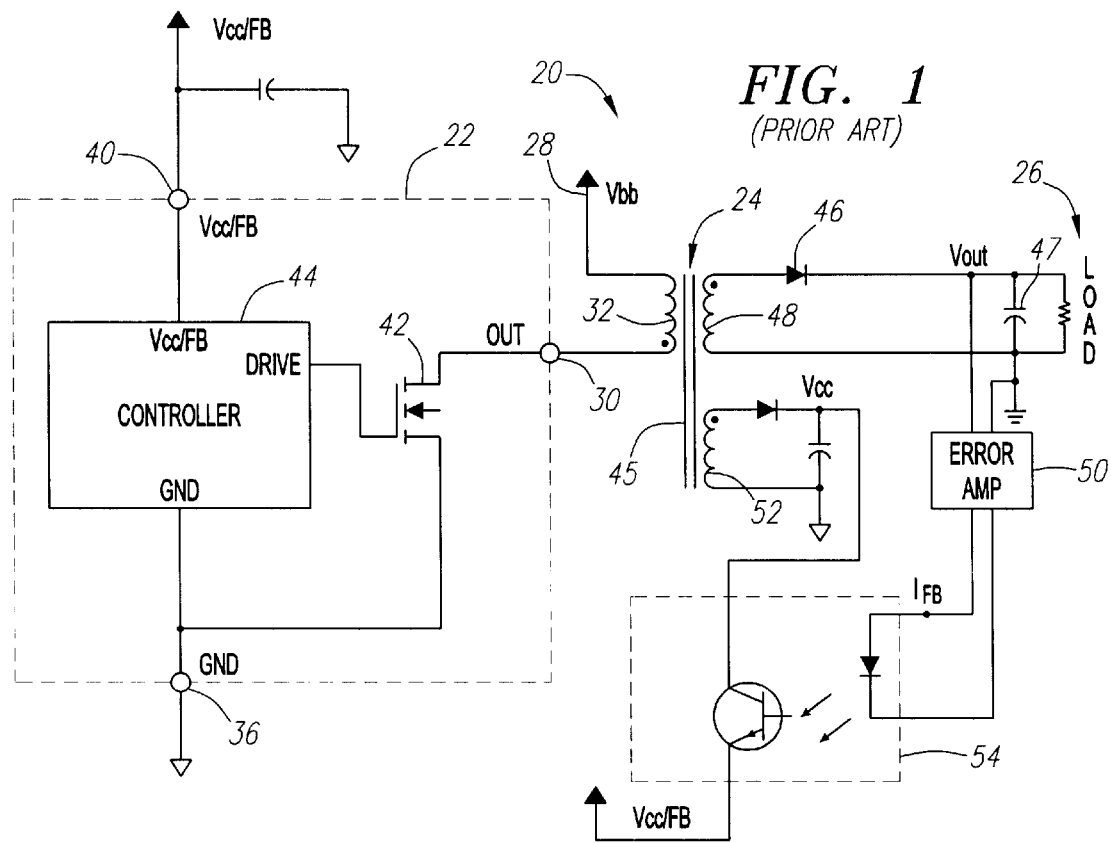
FIG. 1 is a schematic diagram of a flyback converter employing a prior art three-terninal switching power supply chip.

The combined bias supply and feedback signal is derived in the same fashion as in converters 20 (FIG. 1) and 55 (FIG. 2) described above. Again, the extracted feedback signal IFB is used to control the output of the PWM circuitry 84 to constantly adjust the duty cycle of the power switch 82 so as to transfer greater or lesser current to the secondary.

Figure 3A:
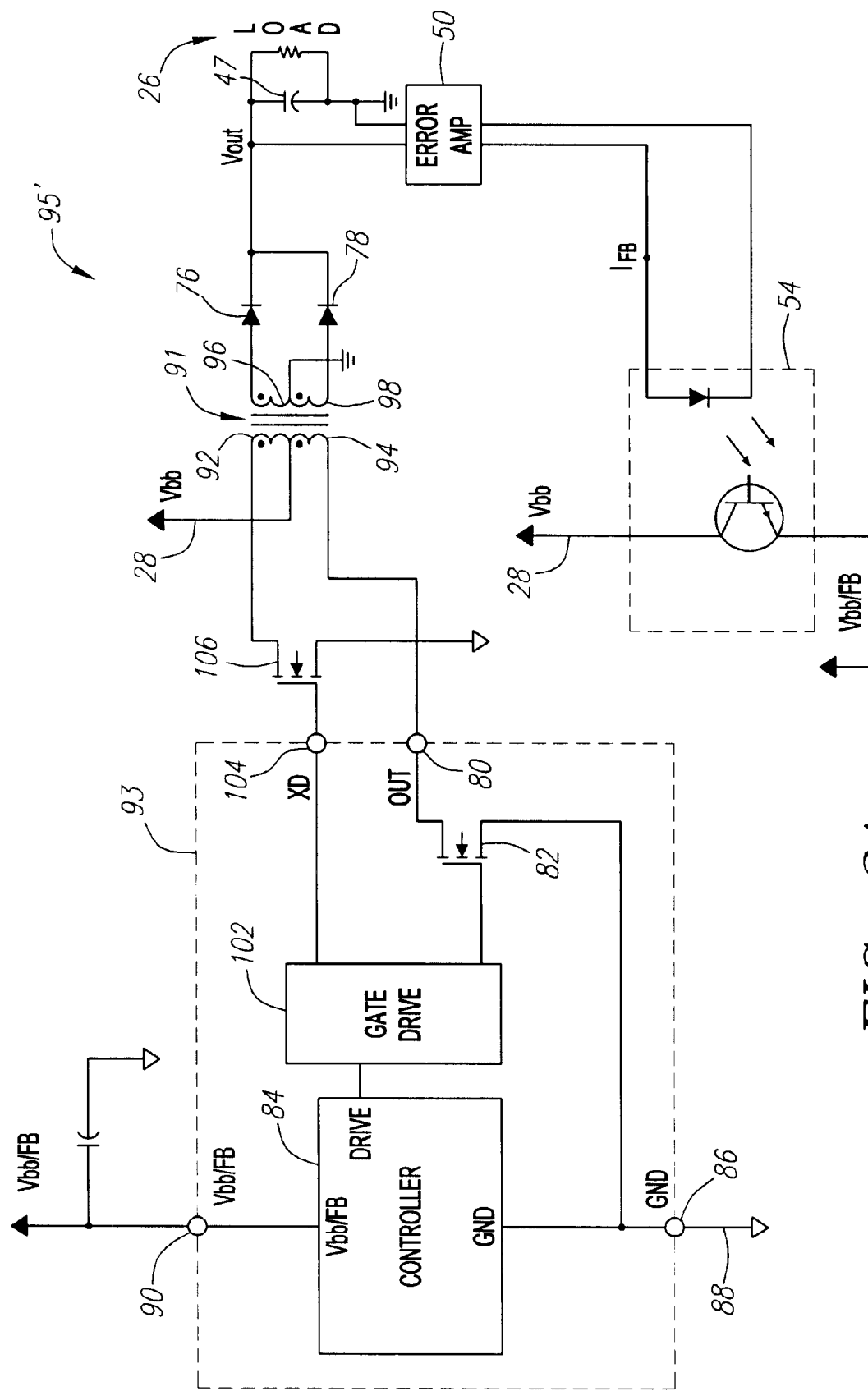
FIG. 3A is a schematic diagram of the push-pull converter of FIG. 3, wherein operating power for the power supply package is supplied by the input supply to the converter.

FIG. 3A shows an alternate embodiment of the push-pull converter topology of FIG. 3 (designated as "95'"), wherein operating power for the power supply package 93 is supplied from the rectified DC source Vbb.

Figure 4:
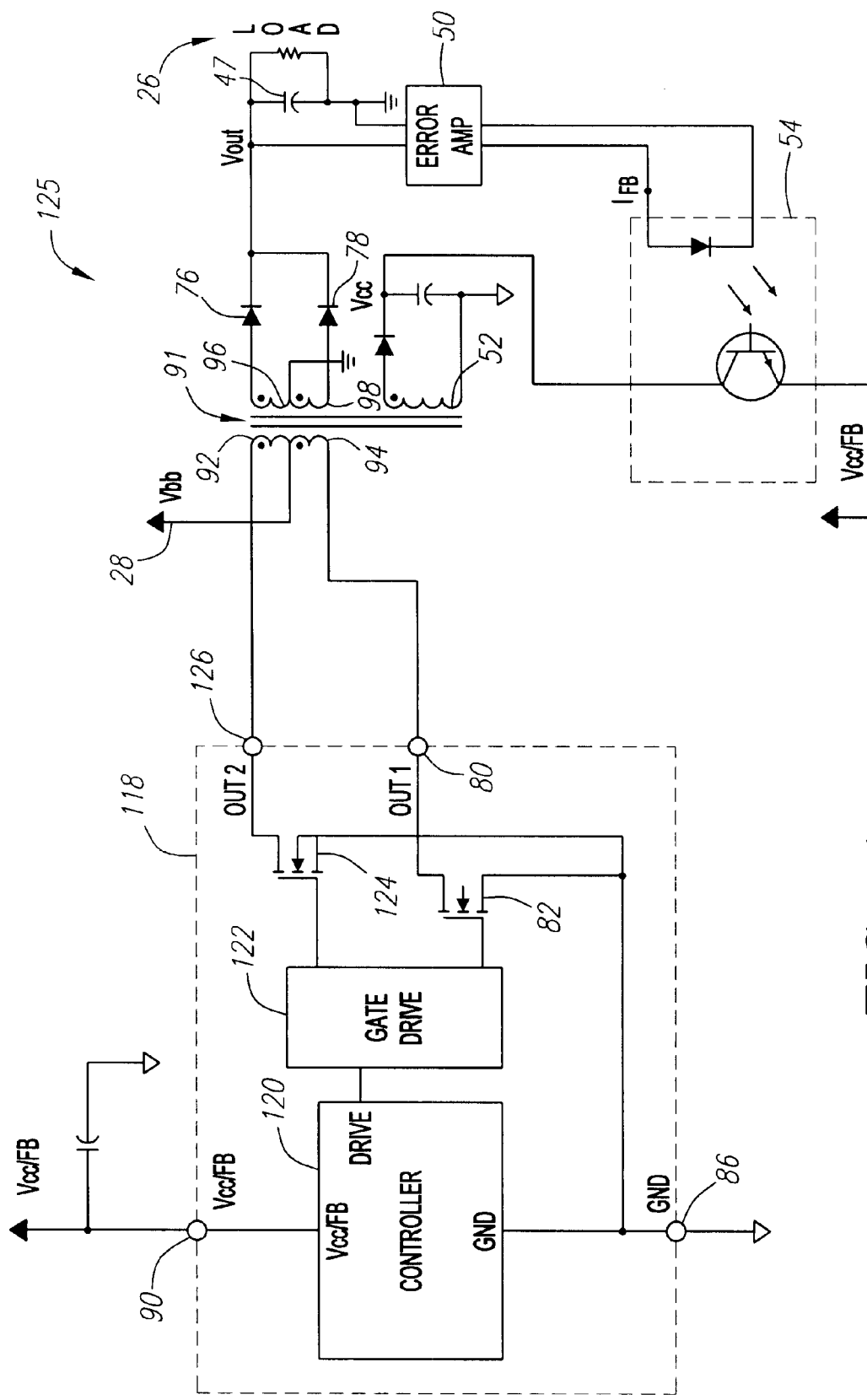
FIG. 4 is a schematic diagram of a second preferred push-pull converter employing a four-terminal switching power supply package constructed in accordance with yet another aspect of the invention, wherein operating power for the power supply package is supplied by an auxiliary output of the converter.

Referring to FIG. 4, in accordance with a still another aspect of the invention, a further alternate push-pull converter 125 employs a four-terminal power supply package 118 to supply current from the DC source Vbb 28 across transformer 91 to supply power to load 26. Converter 125 is identical in operation to converter 95 of FIG. 3, except that both power switches (82, 124) are located within the power supply package 118. In particular, package 118 includes a first terminal 80 coupled to a first end of first primary winding 94 of transformer 91, a second terminal 86 coupled to a primary side ground reference, and a third terminal 90 for accepting a combined feedback control signal (IFB) and bias supply voltage (Vcc). A fourth terminal 126 is coupled a first end of the second primary winding 92. Source Vbb 28 is coupled a second end of the first primary winding 94, and is also coupled to a second end the second primary winding 92. The first terminal 80 of the power supply package 93 is alternately coupled to the ground terminal 86 by a first internal power switch 82, and the fourth terminal 126 is alternately coupled to the ground terminal 86 by a second internal power switch 82.

By way of a gate drive circuit 122, PWM control circuitry 120 in the power supply package 118 alternately drives the respective first and second internal power switches 124 and 82,—i.e., such that when external switch 124 is ON, internal switch 82 is OFF and vice versa. When the first switch 124 is ON, current flows through primary winding 92 and is transferred through a secondary winding 98 and forward biased diode 78 to the filter/storage capacitor 47 and load 26. When the second switch 82 is ON, current flows through primary winding 94 and is transferred through a secondary winding 96 and forward biased diode 76 to the filter/storage capacitor 47 and load 26. After the transformer 91 is reset, the ON/OFF cycle is repeated.

Figure 4A:
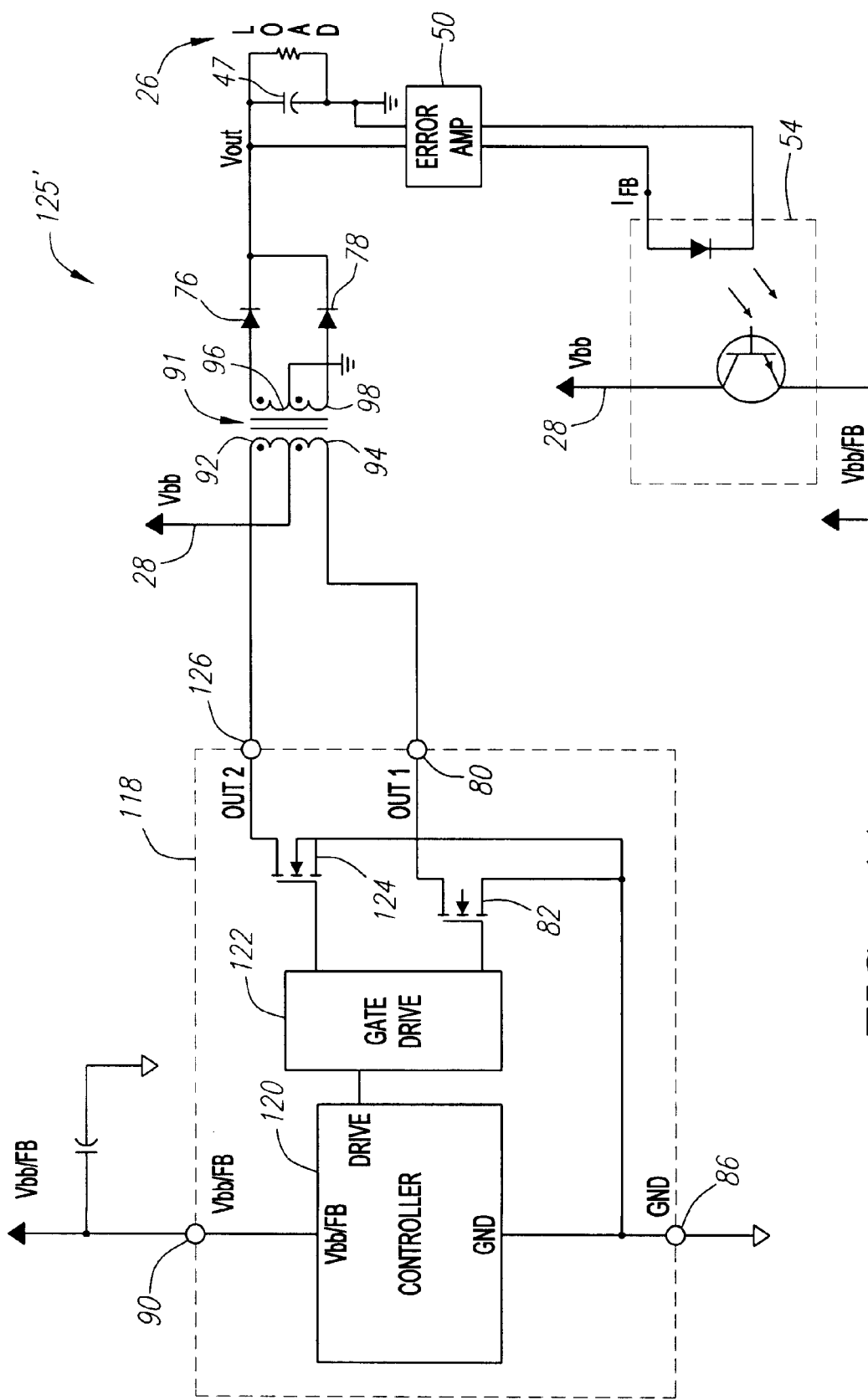
FIG. 4A is a schematic diagram of the push-pull converter of FIG. 4, wherein operating power for the power supply package is supplied by the input supply to the converter.

FIG. 4A shows an alternate embodiment of the push-pull converter topology of FIG. 4 (designated as "125'"), wherein operating power for the power supply package 118 is supplied from the rectified DC source Vbb.

Figure 5:
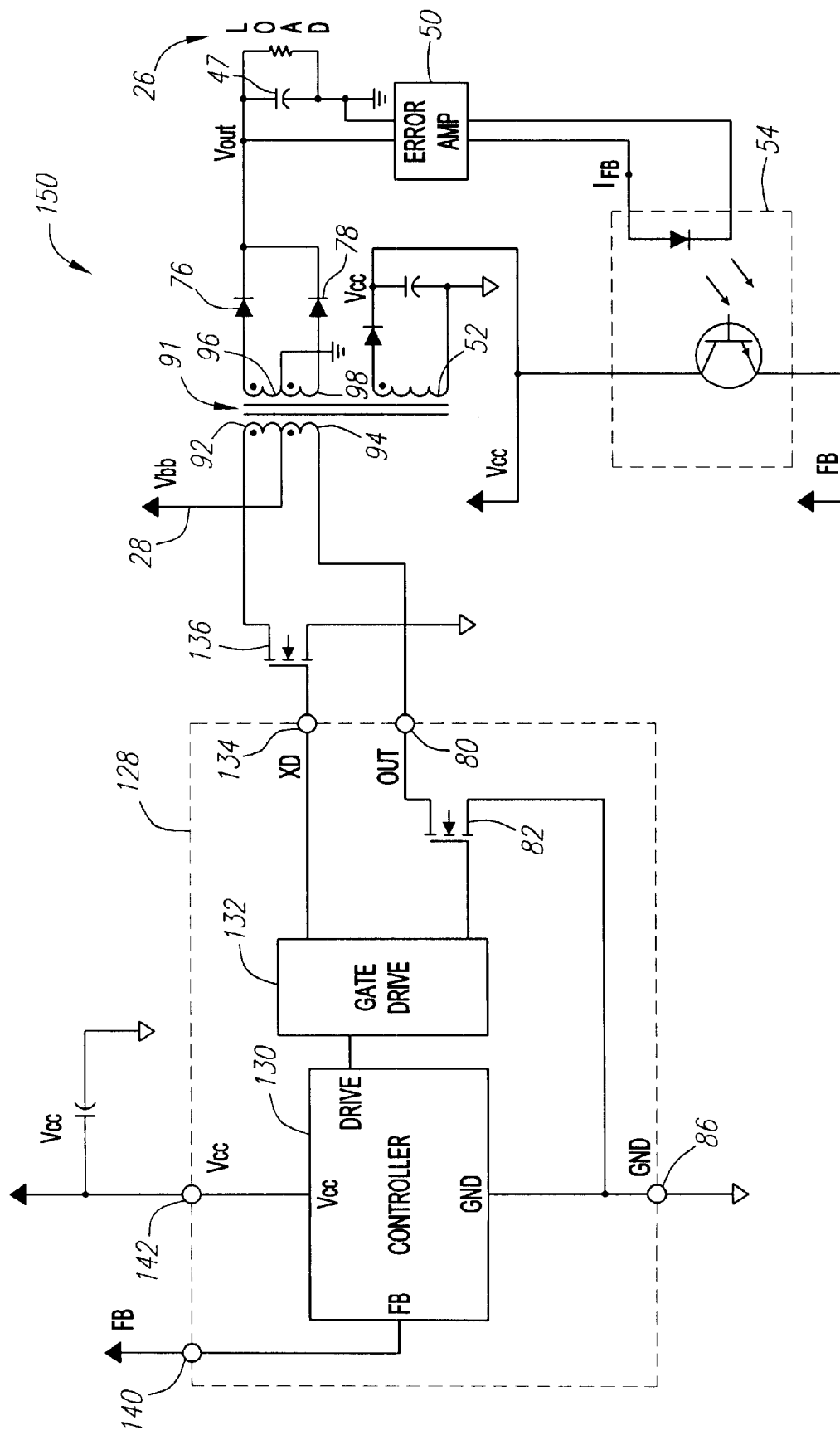
FIG. 5 is a schematic diagram of a third preferred push-pull converter employing a five-terminal switching power supply package constructed in accordance with still another aspect of the invention, wherein operating power for the power supply package is supplied by an auxiliary output of the converter.

Referring to FIG. 5, in accordance with a yet another aspect of the invention, a further alternate push-pull converter 150 employs a five-terminal power supply package 128 to supply current from the DC source Vbb 28 across transformer 91 to supply power to load 26. Converter 128 is identical in operation to converter 95 of FIG. 3, except that the secondary feedback signal is not combined with the bias supply voltage (Vcc), but instead is supplied on a separate package terminal (140). Thus, no extraction circuit is needed to separate the feedback signal IFB from the bias supply voltage Vcc.

The power supply package 128 includes a first terminal 80 coupled to a first end of a first primary winding 94 of transformer 91, a second terminal 86 coupled to a primary side ground reference, a third terminal 140 for accepting a feedback control signal (IFB), a fourth terminal 142 for accepting a bias supply voltage (Vcc), and a fifth terminal 134 coupled the activation gate of an external power switch 136. Source Vbb 28 is coupled a second end of the first primary winding 94, and is also coupled to a first end of a second primary winding 92 of transformer 91. A second end of the second primary winding 92 is coupled to the drain terminal of the external power switch 136, with the source terminal of switch 136 coupled to the primary side ground reference. The first terminal 80 of the power supply package 128 is alternately coupled to the ground terminal 86 by an internal power switch 82.

By way of a gate drive circuit 132, PWM control circuitry 130 in the power supply package 128 alternately drives the internal power switch 82 and external power switch 136,—i.e., such that when external switch 136 is ON, internal switch 82 is OFF and vice versa. When the external power switch 136 is ON, current flows through primary winding 92 and is transferred through a secondary winding 98 and forward biased diode 78 to the filter/storage capacitor 47 and load 26. When the internal switch 82 is ON, current flows through primary winding 94 and is transferred through a secondary winding 96 and forward biased diode 76 to the filter/storage capacitor 47 and load 26. After the transformer 91 is reset, the ON/OFF cycle is repeated.

Figure 5A:
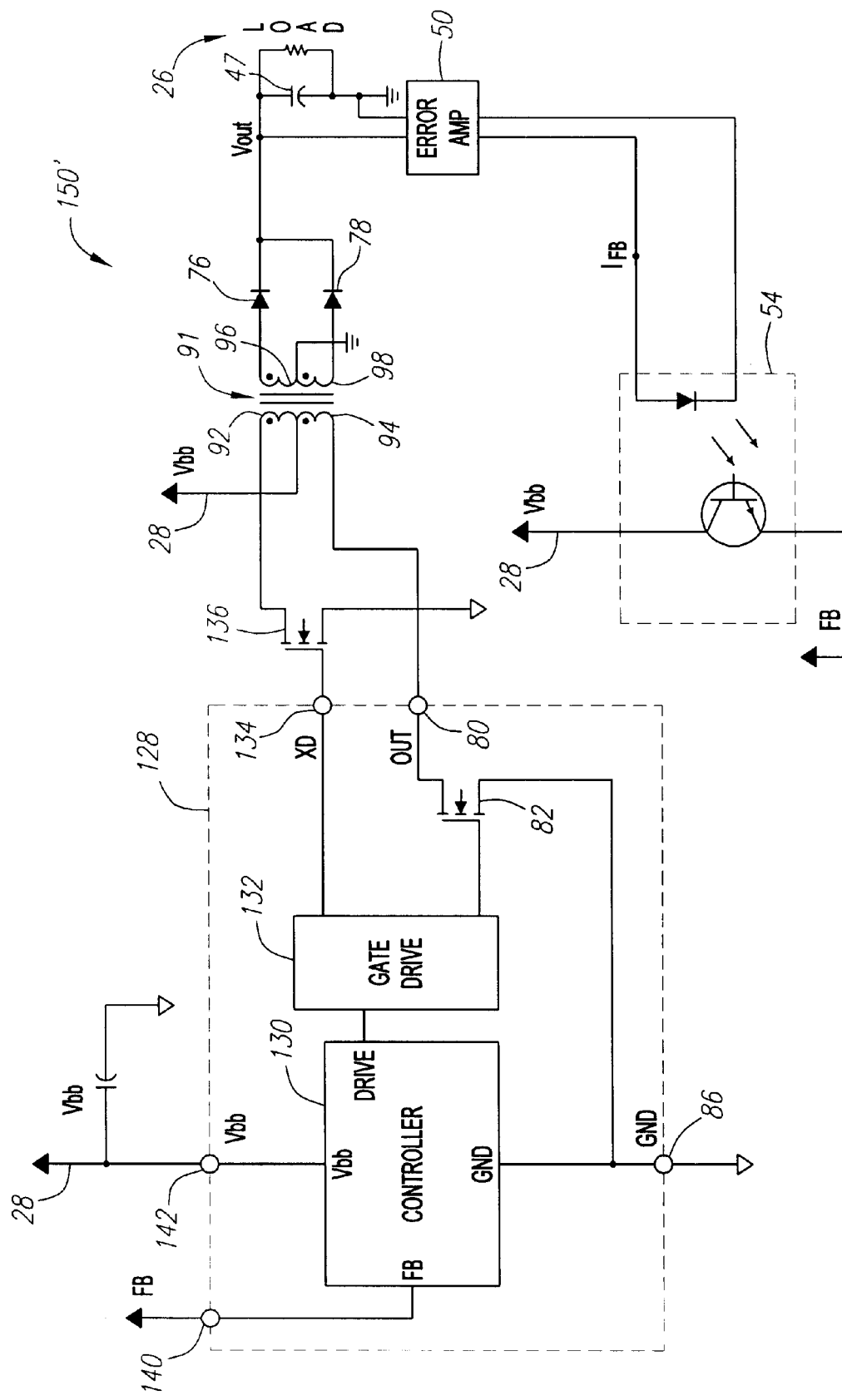
FIG. 5A is a schematic diagram of the push-pull converter of FIG. 5, wherein operating power for the power supply package is supplied by the input supply to the converter.

FIG. 5A shows an alternate embodiment of the push-pull converter topology of FIG. 5 (designated as "150'"), wherein operating power for the power supply package 128 is supplied from the rectified DC source Vbb.

Figure 6:
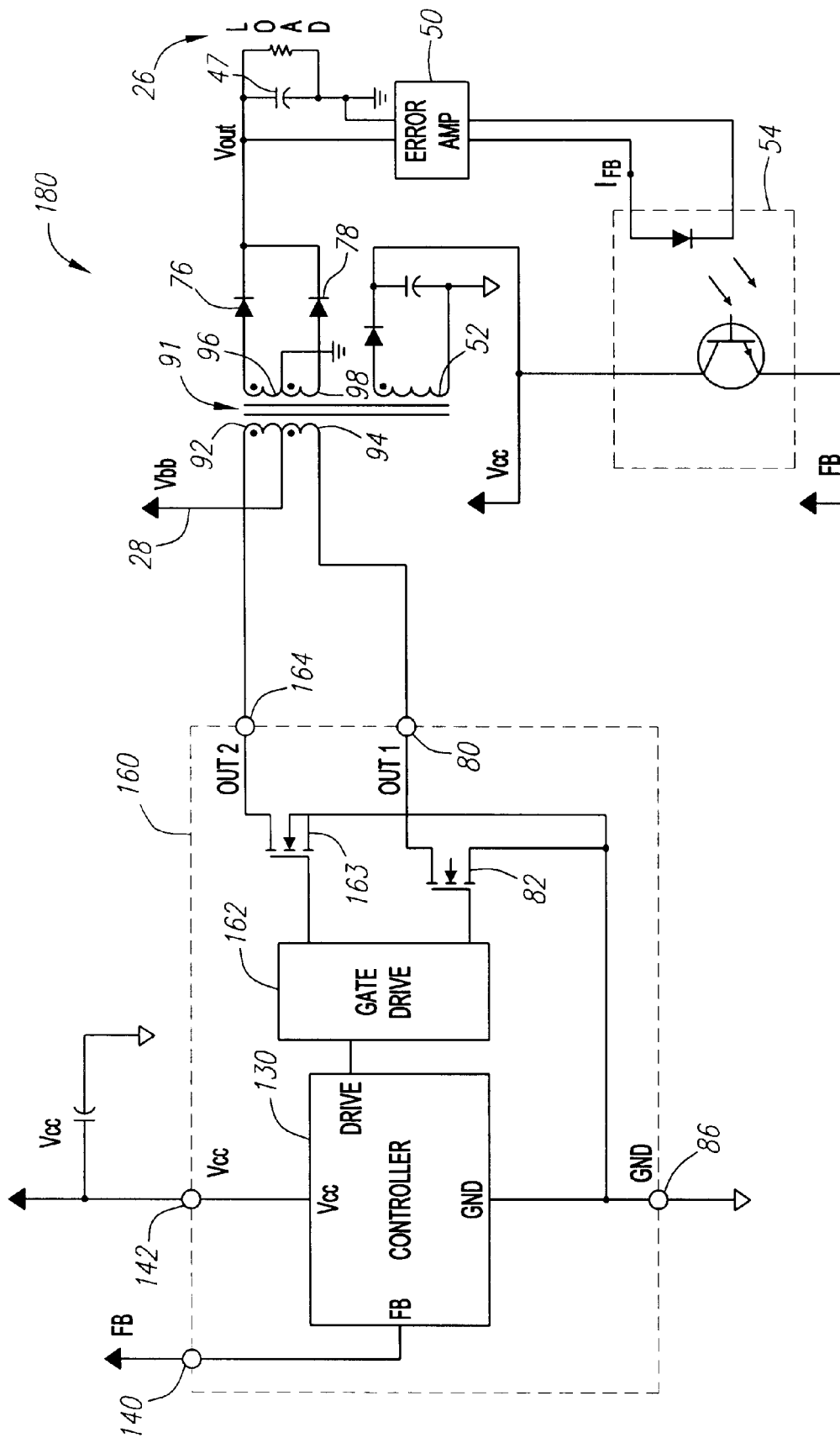
FIG. 6 is a schematic diagram of a fourth preferred push-pull converter employing a five-terminal switching power supply package constructed in accordance with yet another aspect of the invention, wherein operating power for the power supply package is supplied by an auxiliary output of the converter.

Referring to FIG. 6, in accordance with a yet another aspect of the invention, a further alternate push-pull converter 180 employs a five-terminal power supply package 160 to supply current from the DC source Vbb 28 across transformer 91 to supply power to load 26. Converter 180 is identical in operation to converter 150 of FIG. 5, except that both power switches (82, 163) are located within the power supply package 160.

The power supply package 160 includes a first terminal 80 coupled to a first end of a first primary winding 94 of transformer 91, a second terminal 86 coupled to a primary side ground reference, a third terminal 140 for accepting a feedback control signal (IFB), and a fourth terminal 142 for accepting a bias supply voltage (Vcc). ). A fifth terminal 164 is coupled a first end of the second primary winding 92. Source Vbb 28 is coupled a second end of the first primary winding 94, and is also coupled to a second end the second primary winding 92. The first terminal 80 of the power supply package 160 is alternately coupled to the ground terminal 86 by a first internal power switch 82, and the fifth terminal 164 is alternately coupled to the ground terminal 86 by a second internal power switch 163.

By way of a gate drive circuit 162, PWM control circuitry 130 in the power supply package 160 alternately drives the respective first and second internal power switches 163 and 82,—i.e., such that when external switch 163 is ON, internal switch 82 is OFF and vice versa. When the first switch 163 is ON, current flows through primary winding 92 and is transferred through a secondary winding 98 and forward biased diode 78 to the filter/storage capacitor 47 and load 26. When the second switch 82 is ON, current flows through primary winding 94 and is transferred through a secondary winding 96 and forward biased diode 76 to the filter/storage capacitor 47 and load 26. After the transformer 91 is reset, the ON/OFF cycle is repeated.

Figure 6A:
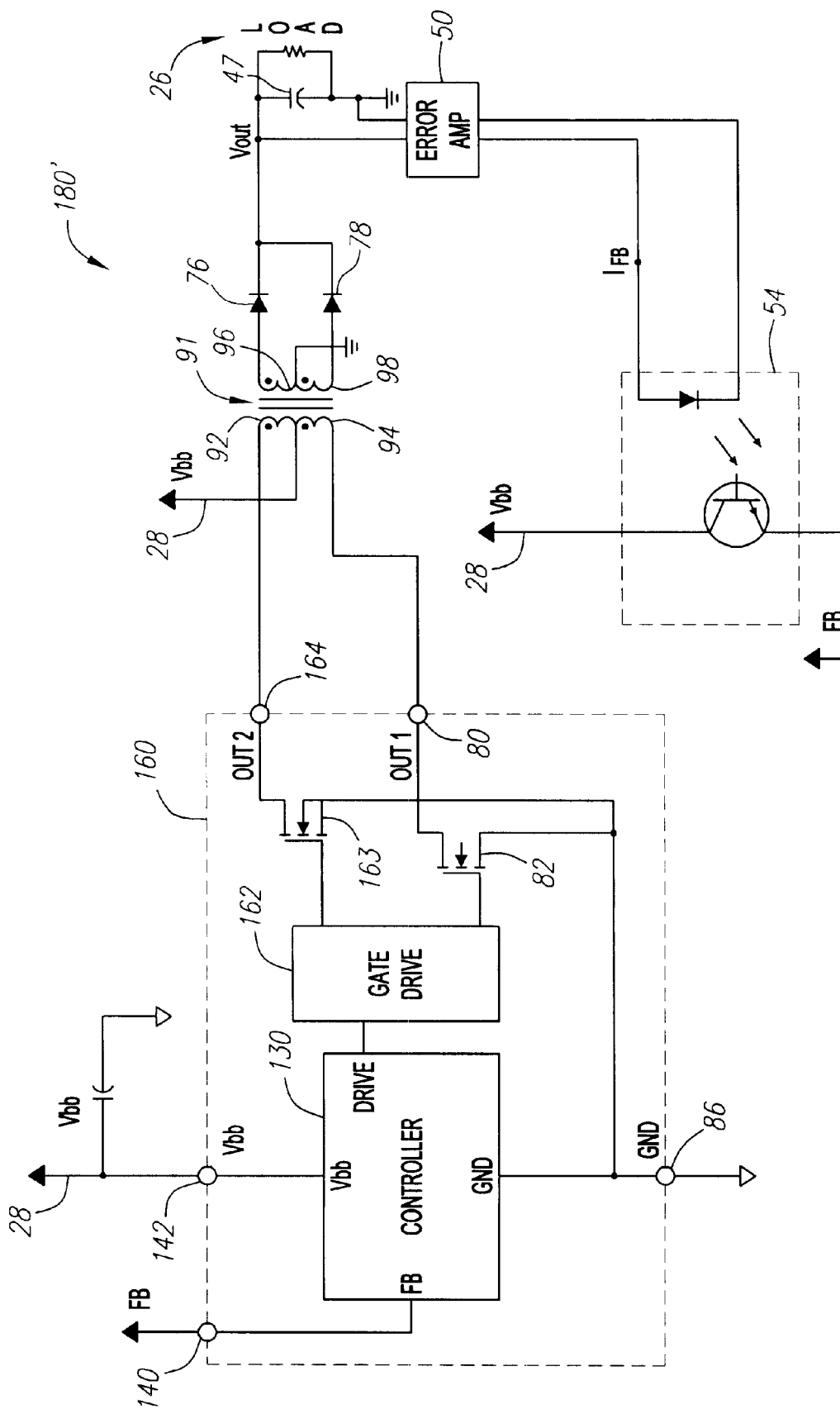
FIG. 6A is a schematic diagram of the push-pull converter of FIG. 6, wherein operating power for the power supply package is supplied by the input supply to the converter.

FIG. 6A shows an alternate embodiment of the push-pull converter topology of FIG. 6 (designated as "180'"), wherein operating power for the power supply package 160 is supplied from the rectified DC source Vbb.

Figure 7:
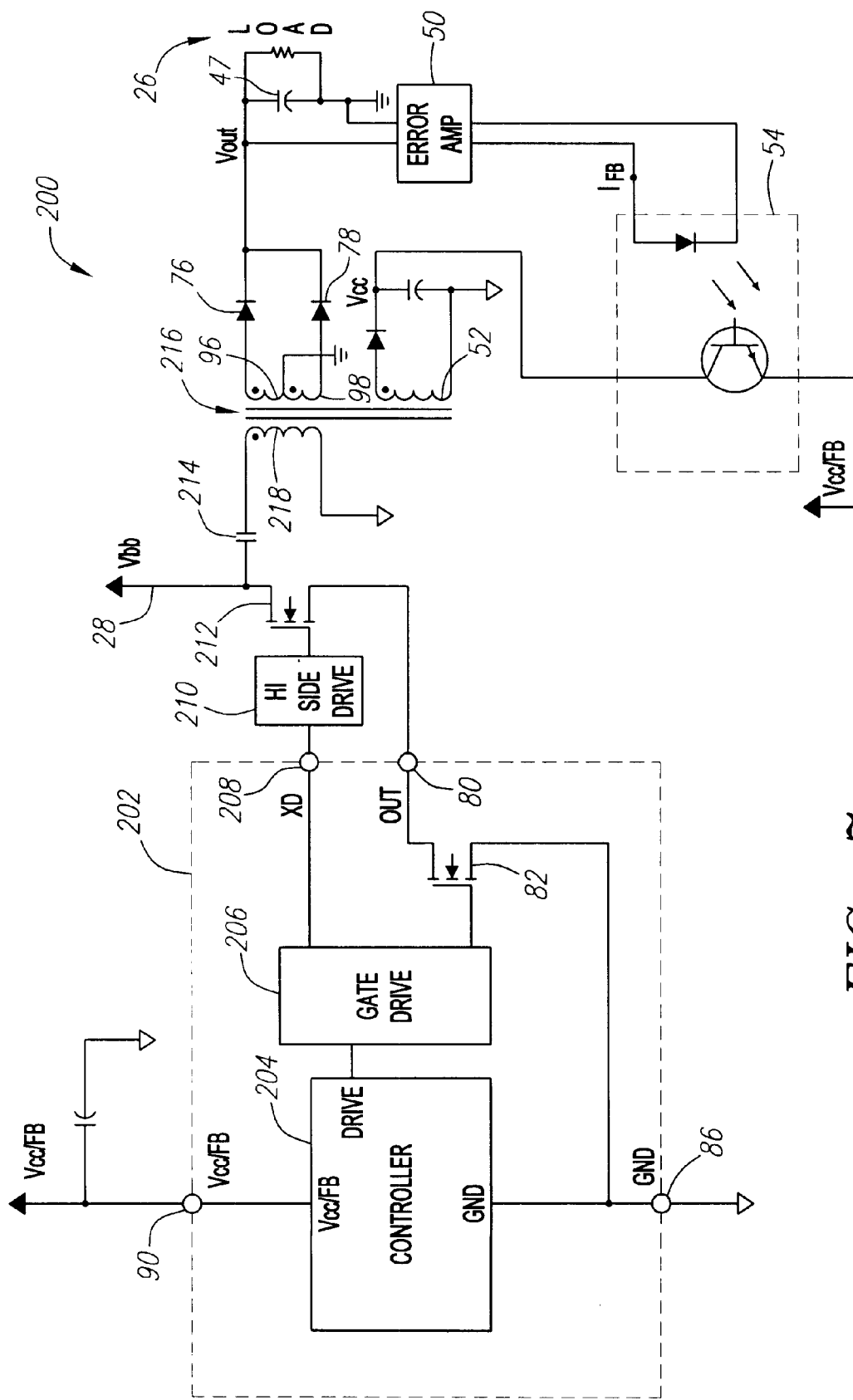
FIG. 7 is a schematic diagram of a preferred half-bridge converter employing a four-terminal switching power supply package constructed in accordance with still another aspect of the invention.

Referring to FIG. 7, in accordance with a yet another aspect of the invention, a half bridge converter 200 employs a four-terminal power supply package 202 to supply current from the DC source Vbb 28 across isolating transformer 216 to supply power to load 26. The power supply package 202 includes a first terminal 80 coupled to a first terminal of a resonant capacitor 214. A second terminal of the capacitor 214 is coupled to one end of primary winding 218 of transformer 216, with a second end of the primary winding 218 coupled to a primary side ground reference. The first terminal of capacitor 214 and package terminal 80 are also coupled to the source terminal of an external power switch 212 driven by a conventional hi-side drive 210, with the drain terminal of switch 212 coupled to Vbb. The power supply package 202 includes a second terminal 86 coupled to the primary side ground reference, a third terminal 90 for accepting a combined feedback control signal (IFB) and a bias supply voltage (Vcc) , and a fourth terminal 208 for activating hi-side drive switch 212.

The first package terminal 80 is alternately coupled to the ground terminal 86 by an internal power switch 82. PWM control circuitry 204 alternately drives the internal switch 82 and hi-side drive switch 212,—i.e., when hi-side drive switch 212 is ON, internal switch 82 is OFF and vice versa, by a gate drive circuit 206 at a variable duty cycle. When the hi-side switch 212 is ON (and internal switch 82 OFF), current from the source Vbb 28 charges the capacitor 214 and then flows (clockwise) through primary winding 218, where it is transferred through secondary winding 96 and diode 76 to the filter/storage capacitor 47 and load 26. When the internal switch 82 is ON (and hi-side switch 212 OFF), the capacitor discharges, causing current flowing in the reverse (i.e., counterclockwise) direction through the primary winding 218 to be transferred through second secondary winding 98 and diode 78 to the filter/storage capacitor 47 and load 26. As will be appreciated by those skilled in the art, the transformer 216 is a "real" transformer in that current flows in both directions through the primary winding 218. Thus, no special reset circuitry is needed.

Figure 7A:
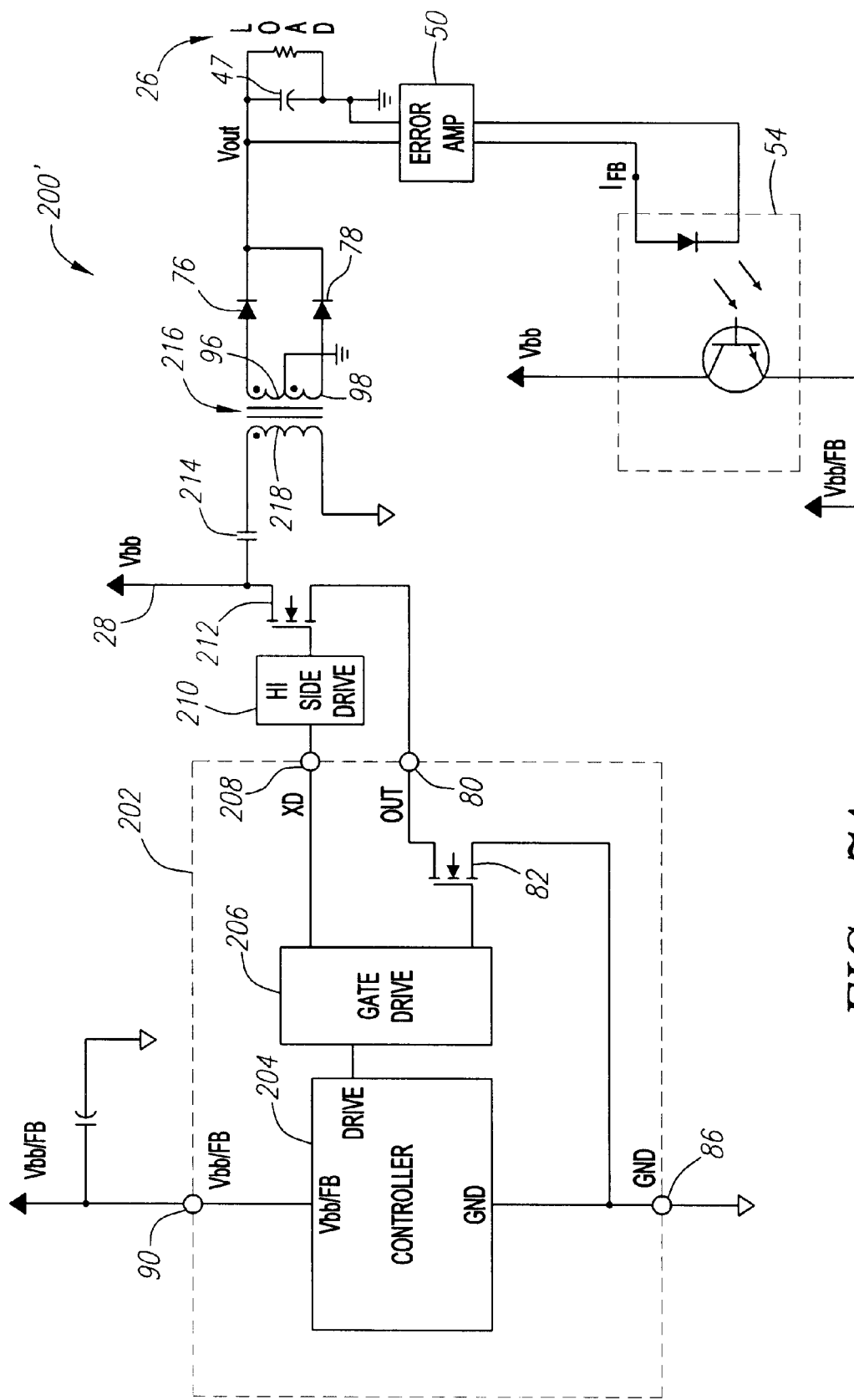
FIG. 7A is a schematic diagram of the half-bridge converter of FIG. 7, wherein operating power for the power supply package is supplied by the input supply to the converter.

FIG. 7A shows an alternate embodiment of the half-bridge converter topology of FIG. 7 (designated as "200'"), wherein operating power for the power supply package 202 is supplied from the rectified DC source Vbb.

Figure 8:
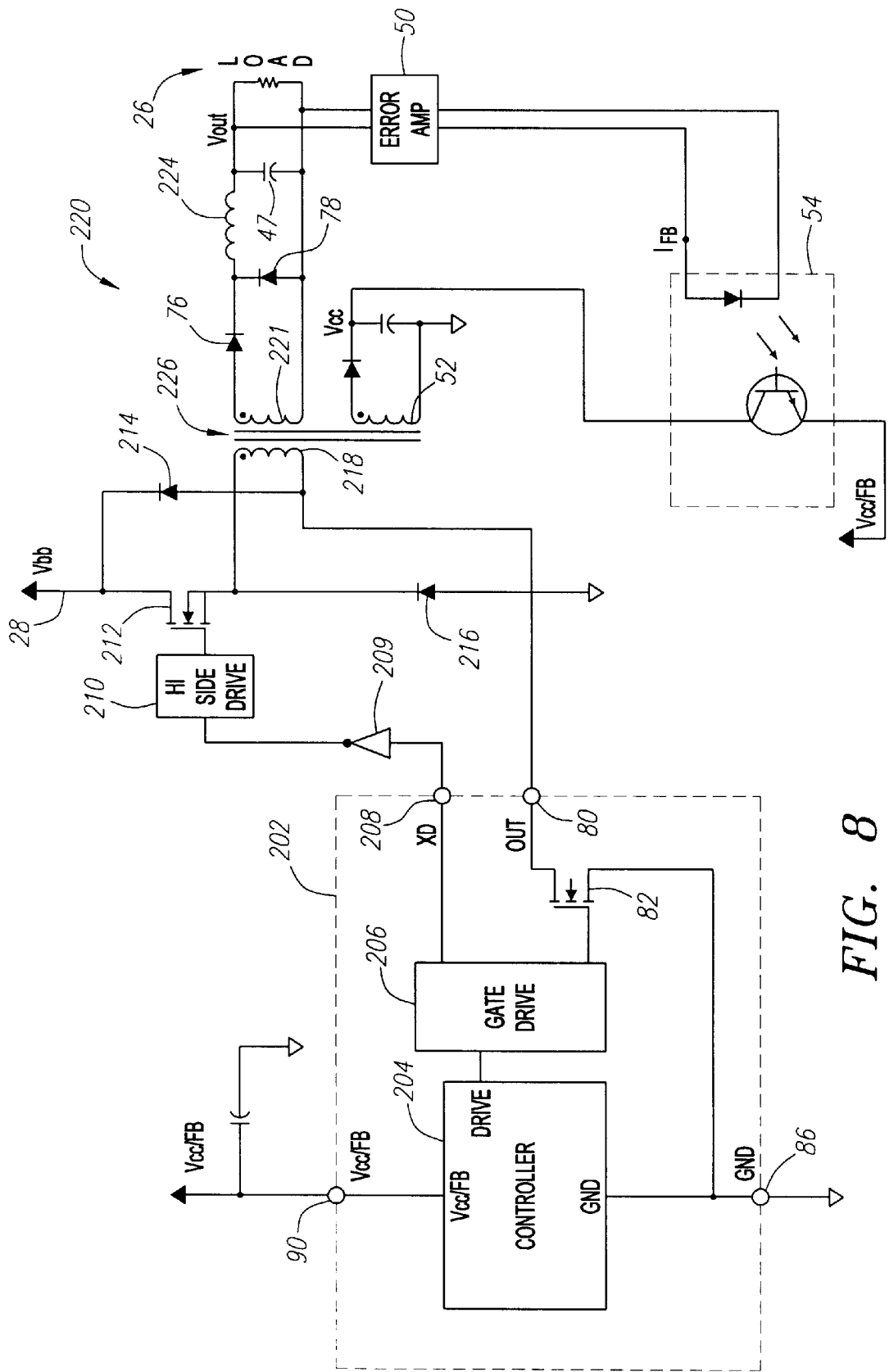
FIG. 8 is a schematic diagram of a preferred interleaved forward converter employing a four-terminal switching power supply package constructed in accordance with yet another aspect of the invention.

Referring to FIG. 8, in accordance with still another aspect of the invention, an interleaved forward converter 220 may also employ the four-terminal power supply package 202 of FIG. 7 to supply current from the DC source Vbb 28 across an isolating transformer 226 to supply power to load 26. Converter 220 also employs hi-side drive 210 driving external switch 212, but includes an inverter 209 in the control path from the gate drive 206, so that the hi-side switch 212 and internal power switch 82 are activated (ON) at the same time and according to the same duty cycle. Use of the inverter 209 allows the supply package 202 to be used without having to change the gate drive 206 configuration. In an alternate embodiment, gate drive circuit 206 may be configured so that the drive signals for switches 212 and 82 are both "high" at the same time so that the inverter 209 would not be necessary for converter 220. (Instead, of course, an inverter would be necessary for converter 200).

In converter 220, the first power supply package terminal 80 is coupled to a first end of a primary winding 228 of transformer 226, with the second end of primary winding 228 coupled to the source terminal of hi-side switch 212. The source terminal of hi-side switch 212 and second end of winding 228 are also coupled to ground via a first reverse-biased diode 216. The drain of hi-side switch 212 is coupled to ground via a second reverse-biased diode 214. During operation of the converter 220, when both switches 212 and 82 are ON, current from the source Vbb flows (clockwise) through primary winding 228, where it is transferred through secondary winding 220 and diode 76 to a storage inductor 224. When switches 212 and 82 are OFF, current flows in the reverse (i.e., counterclockwise) direction through the primary winding 218, and is transferred through second secondary winding 98 and diode 78 to the storage inductor 224. The inductor, in concert with the filter/storage capacitor 47, then supplies the stored power to the load 26. When switches 82 and 212 are OFF, diodes 214 and 216 allow current to return to the source Vbb, while safely clamping the voltage across the drain of switch 82, thereby resetting the core of transformer 226 before the power transfer cycle is repeated.

Figure 8A:
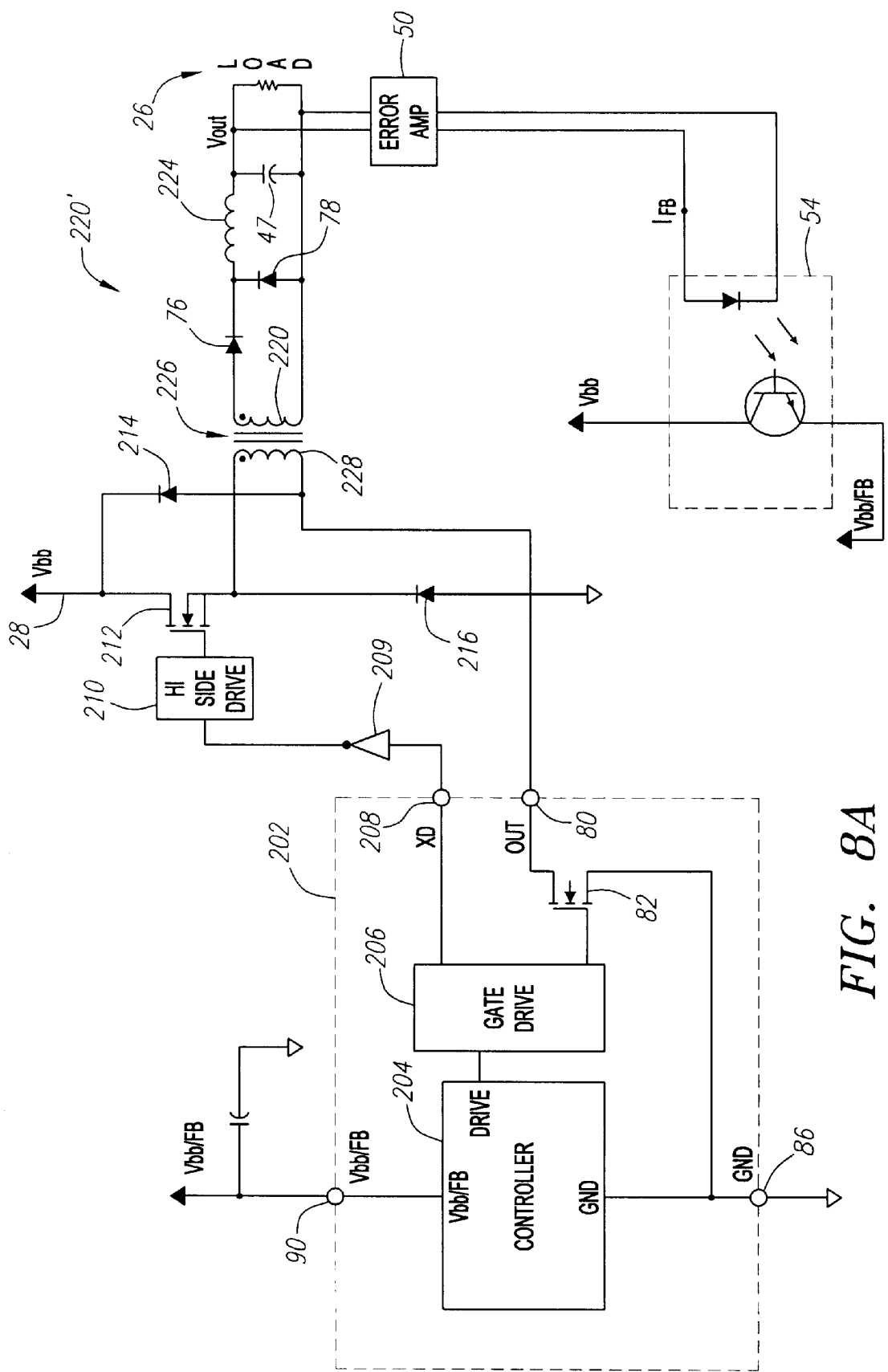
FIG. 8A is a schematic diagram of the interleaved forward converter of FIG. 8, wherein operating power for the power supply package is supplied by the input supply to the converter.

FIG. 8A shows an alternate embodiment of the interleaved forward converter topology of FIG. 8 (designated as "220'"), wherein operating power for the power supply package 202 is supplied from the rectified DC source Vbb.

Figure 9:
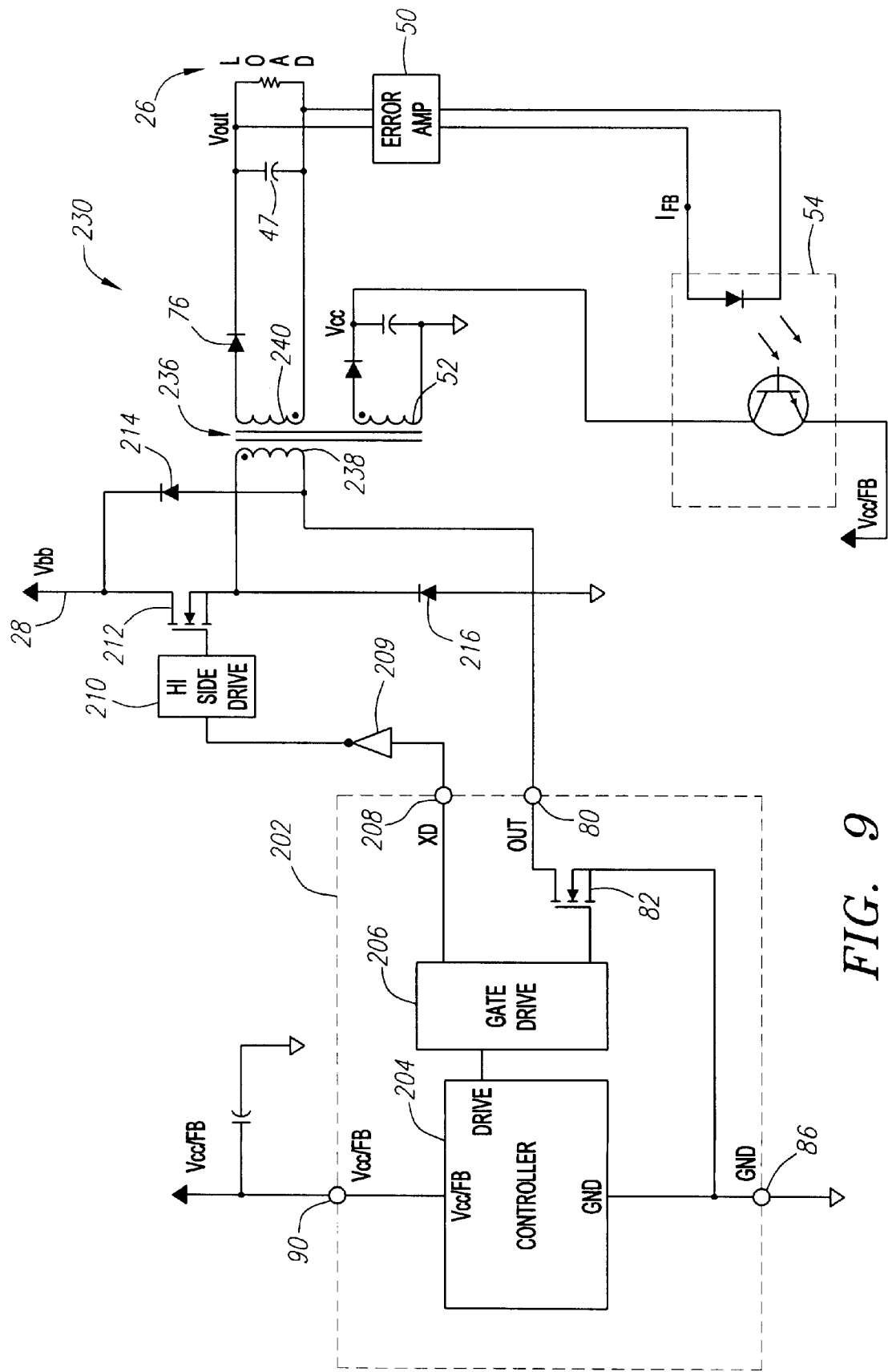
FIG. 9 is a schematic diagram of a preferred interleaved flyback converter employing a four-terminal switching power supply package constructed in accordance with still another aspect of the invention.

Referring to FIG. 9, in accordance with still another aspect of the invention, an interleaved flyback converter 230 may also employ the four-terminal power supply package 202 of FIGS. 7 and 8 to supply current from the DC source Vbb 28 across an isolating transformer 236 to supply power to load 26. Converters 220 and 230 are almost identical, except that the polarity of the transformer windings (primary winding 238, secondary winding 240) are in a flyback orientation, and there is no secondary side storage inductor. Thus, when both switches 212 and 82 are ON, current from the source Vbb flows (clockwise) through primary winding 238, where it is stored as energy in the transformer core. When switches 82 and 212 are OFF, the stored energy is release as current through the secondary winding 240, which passes through diode 76 to the filter/storage capacitor 47 and load 26.

Figure 9A:
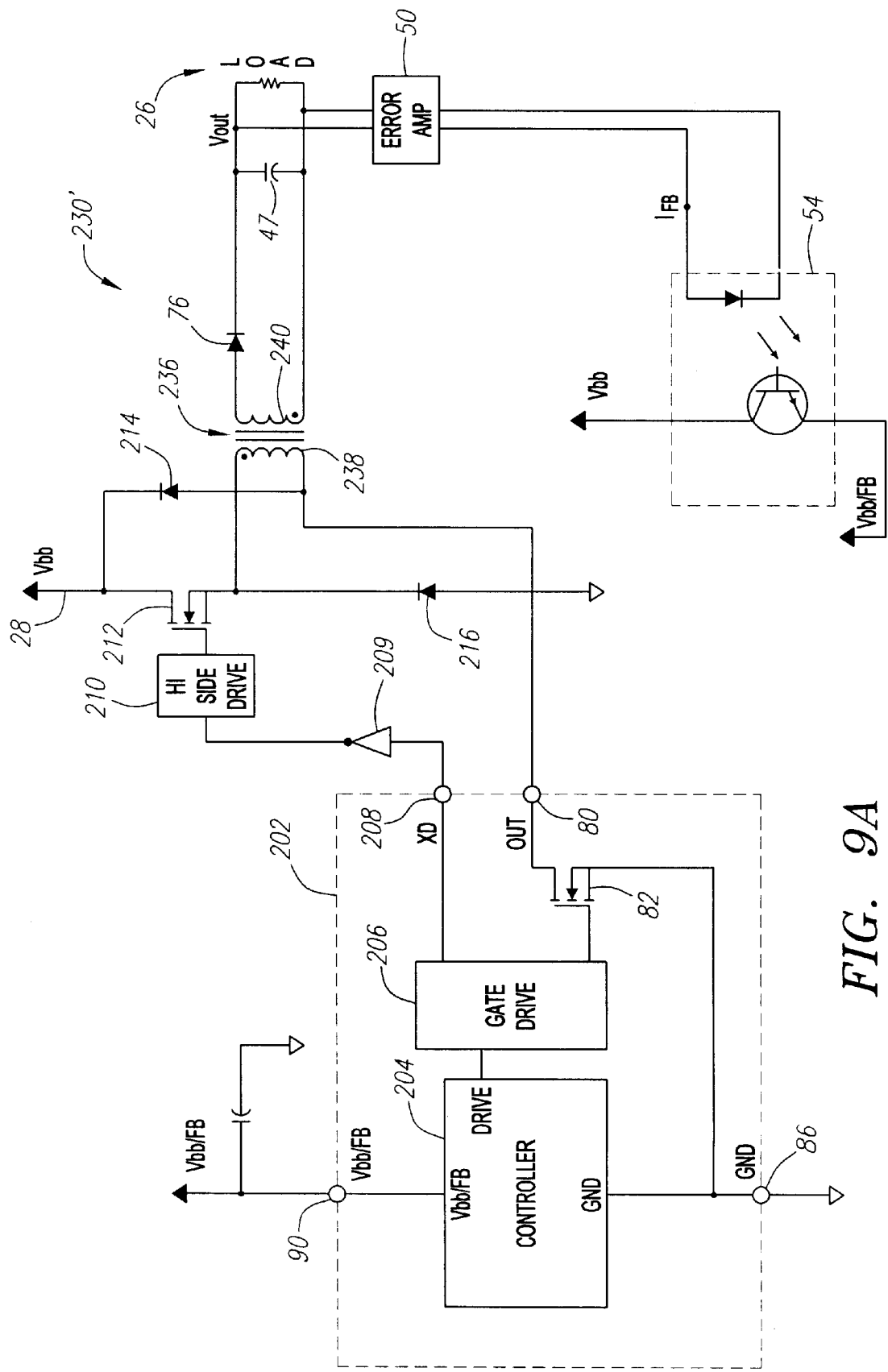
FIG. 9A is a schematic diagram of the interleaved flyback converter of FIG. 9, wherein operating power for the power supply package is supplied by the input supply to the converter.

FIG. 9A shows an alternate embodiment of the interleaved flyback converter topology of FIG. 9 (designated as "230'"), wherein operating power for the power supply package 202 is supplied from the rectified DC source Vbb.

Notably, the elements of each preferred power supply package disclosed and described herein may be provided as a single, monolithic integrated circuit, or alternately may comprise multiple components mounted to a single or multiple substrates. Further, while the multi-switch embodiments of FIGS. 3–9 show a separate functional box for the gate drive circuitry, this is done for ease in illustration, and it will be apparent to those skilled in the art that such gate drive circuitry may alternately be considered part of the PWM control circuitry instead of a separate functional block.

Although the invention has been described in terms of the presently preferred embodiments, it will be understood by those skilled in the art that many other embodiments and variations of the invention are possible after having read the disclosure. According, the invention is not to be limited except in accordance with the appended claims and their equivalents.

What is claimed:

1. A power supply package for providing pulse-width modulated control of a power converter, comprising:
   a first terminal for coupling to a primary winding of a transformer;
   a second terminal for coupling to an activation gate of an external power switch;
   a third terminal for coupling to a ground reference;
   a fourth terminal for coupling to a combined source of operating power and feedback signal, the feedback signal based on an output load voltage across a secondary winding of the transformer;
   an internal power switch having an input coupled to the first terminal, an output coupled to the third terminal, and an activation gate; and
   PWM control circuitry responsive to the feedback signal, the control circuitry including gate drive circuitry having a first output coupled to the internal switch activation gate and a second output coupled to the second terminal, the gate drive circuitry configured to drive the internal and external power switches.

2. A power converter including the power supply package of claim 1, wherein operating power for the power supply package is supplied by an auxiliary secondary winding of the transformer.

3. A power converter including the power supply package of claim 1, wherein operating power for the power supply package is supplied by a power source for the converter.

4. A push-pull power converter including the power supply package of claim 1.

5. A half-bridge converter including the power supply package of claim 1.

6. An interleaved forward converter including the power supply package of claim 1.

7. An interleaved flyback converter including the power supply package of claim 1.

8. The power supply package of claim 1, wherein the internal power switch and control circuitry are formed as part of a single integrated circuit.

9. A power supply package for providing pulse-width modulated control of a power converter, comprising:
   a first terminal for coupling to a first primary winding of a transformer;
   a second terminal for coupling to a second primary winding of the transformer;
   a third terminal for coupling to a ground reference;
   a fourth terminal for coupling to a combined source of operating power and feedback signal, the feedback signal based on an output load voltage across a secondary winding of the transformer;
   a first power switch having an input coupled to the first terminal, an output coupled to the third terminal, and a first switch activation gate;
   a second power switch having an input coupled to the second terminal, an output coupled to the third terminal, and a second switch activation gate; and
   control circuitry responsive to the feedback signal, the control circuitry including gate drive circuitry having a first output coupled to the first switch activation gate and a second output coupled to the second switch activation gate, the gate drive circuitry configured to drive the first and second power switches.

10. A power converter including the power supply package of claim 9, wherein operating power for the power supply package is supplied by an auxiliary secondary winding of the transformer.

11. A power converter including the power supply package of claim 9, wherein operating power for the power supply package is supplied by a power source for the converter.

12. A push-pull power converter including the power supply package of claim 9.

13. A half-bridge converter including the power supply package of claim 9.

14. An interleaved forward converter including the power supply package of claim 9.

15. An interleaved flyback converter including the power supply package of claim 9.

16. The power supply package of claim 9, wherein the first and second power switches and control circuitry are formed as part of a single integrated circuit.

17. A power supply package for providing pulse-width modulated control of a power converter, comprising:

a first terminal for coupling to a primary winding of a transformer;

a second terminal for coupling to an activation gate of an external power switch;

a third terminal for coupling to a ground reference;

a fourth terminal for coupling to a source of operating power;

a fifth terminal for coupling to a feedback signal based on an output load voltage across a secondary winding of the transformer;

an internal power switch having an input coupled to the first terminal, an output coupled to the third terminal, and an activation gate; and control circuitry responsive to the feedback signal, the control circuitry including gate drive circuitry having a first output coupled to the internal power switch activation gate and a second output coupled to the second terminal, the gate drive circuitry configured to drive the internal and external power switches.

18. A power converter including the power supply package of claim 17, wherein operating power for the power supply package is supplied by an auxiliary secondary winding of the transformer.

19. A power converter including the power supply package of claim 17, wherein operating power for the power supply package is supplied by a power source for the converter.

20. A push-pull power converter including the power supply package of claim 17.

21. A half-bridge converter including the power supply package of claim 17.

22. An interleaved forward converter including the power supply package of claim 17.

23. An interleaved flyback converter including the power supply package of claim 17.

24. The power supply package of claim 17, wherein the internal power switch and control circuitry are formed as part of a single integrated circuit.

25. A power supply package for providing pulse-width modulated control of a power converter, comprising:

a first terminal for providing a connection to a first primary winding of a transformer;

a second terminal for providing a connection to a second primary winding of the transformer;

a third terminal for providing a connection to a ground reference;

a fourth terminal for providing a connection to a source of operating power;

a fifth terminal for providing a connection to a feedback signal based on an output load voltage across a secondary winding of the transformer;

a first internal power switch having an input connected to the first terminal, an output connected to the third terminal, and a first switch activation gate;

a second internal power switch having an input connected to the second terminal, an output connected to the third terminal, and a second switch activation gate; and control circuitry responsive to the feedback signal, the control circuitry including gate drive circuitry having a first output coupled to the first switch activation gate and a second output coupled to the second switch activation gate, the gate drive circuitry configured to drive the first and second power switches.

26. A power converter including the power supply package of claim 25, wherein operating power for the power supply package is supplied by an auxiliary secondary winding of the transformer.

27. A power converter including the power supply package of claim 25, wherein operating power for the power supply package is supplied by a power source for the converter.

28. A push-pull power converter including the power supply package of claim 25.

29. A half-bridge converter including the power supply package of claim 25.

30. An interleaved forward converter including the power supply package of claim 25.

31. An interleaved flyback converter including the power supply package of claim 25.

32. The power supply package of claim 25, wherein the first and second power switches and control circuitry are formed as part of a single integrated circuit.

* * * * *